Feb. 12, 1929. 1,702,163

T. A. KECK, JR

DEMOUNTABLE RIM

Filed July 30, 1927 2 Sheets-Sheet 1

Inventor
Theodore A. Keck Jr.
By Mason Fenwick & Lawrence
Attorneys

Feb. 12, 1929.

T. A. KECK, JR 1,702,163

DEMOUNTABLE RIM

Filed July 30, 1927

INVENTOR
Theodore A. Keck Jr.
BY
Mason Fenwick & Lawrence
ATTORNEYS

Patented Feb. 12, 1929.

1,702,163

UNITED STATES PATENT OFFICE.

THEODORE A. KECK, JR., OF RICHMOND, VIRGINIA.

DEMOUNTABLE RIM.

Application filed July 30, 1927. Serial No. 209,480.

My invention relates to improvements in automobile rims and more particularly to those having one detachable tire engaging ring.

The principal object of this invention is to provide means for removing the tire without the removal of the usual lugs.

Another object of this invention is to provide means for securely locking the ring in place.

With the foregoing general objects in view, the invention resides in the novel features of construction and unique combination of parts to be hereinafter fully described and claimed; the descriptive matter being supplemented by the accompanying drawings which form a part of this specification in which:—

In the drawings similar parts are designated by like numerals.

Figure 1:
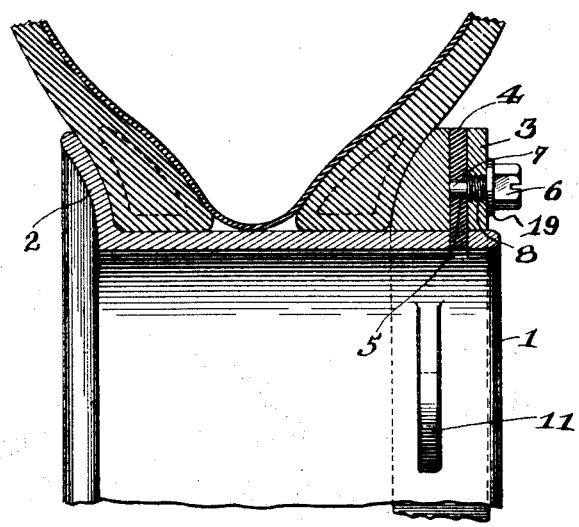
Figure 1 is a cross sectional view of the rim and a portion of tire.
Figure 2:
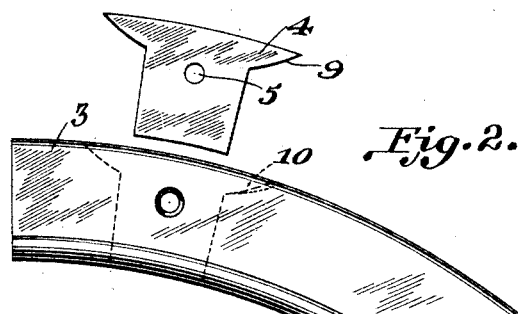
Figure 2 is a fragmentary side elevation of the ring.

The numeral 1 designates an automobile rim body member having an inner flange 2 formed integral therewith, and a ring 3 held in place on the outer edge of the rim body member by means of a key 4 having an opening 5 therein. The screw 6 has a plain end 7 and a screw-threaded part 8 passing through the ring 3 and key 4. The key 4 has shoulders 9 which fit in the opening 10 in the ring 3. The usual lug 11 is attached to the rim member 1. A lock washer 19 is adjacent the screw 6.

Figure 3:
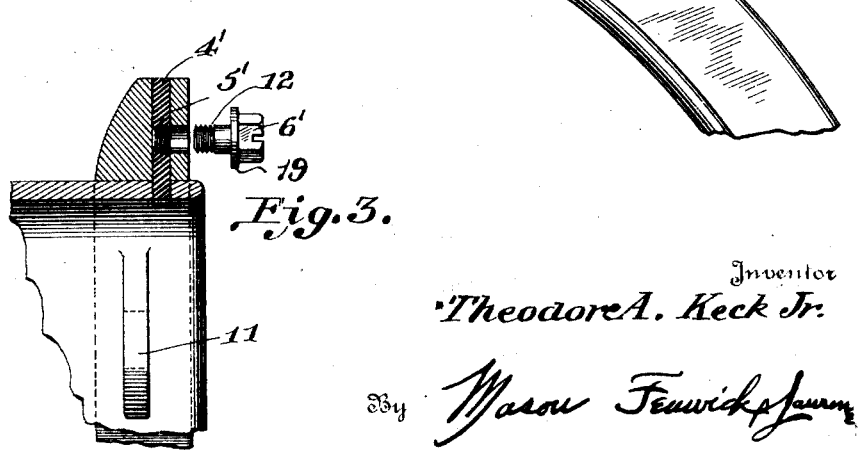
Figure 3 is a section similar to Figure 1 showing a modified form of attaching the ring to the rim.

Figure 3 shows a modified form of a screw 6 wherein the opening 5' in key 4' is threaded so as to receive the threaded portion 12 of screw 6' which is placed on the end instead of adjacent to the head as shown in Figure 1.

By having the threaded portion of screw 6 adjacent the head, as shown in Figure 1, the plain end 7 will coincide with the opening 5 in the key 4 and hold the same securely in position. As shown in Figure 3, it may be preferable to have the threaded portion on the end of the screw 6 adapted to engage threads on the key 4, instead of the ring 3.

In removing the tire from the rim, the screws 6 of which there are preferably about four spaced around the ring, are removed, the keys 4 are then lifted up and the ring 3 slid from the rim member 1. The tire can then easily be removed from the rim member. It will be noted that it is not necessary to remove the rim from the wheel, nor to remove the nuts from the bolts commonly used in connection with the numerous lugs for holding the rim on the wheel.

Figure 4:
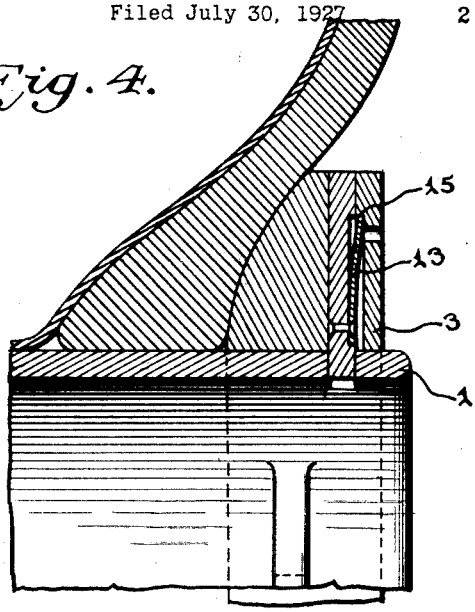
Figure 4 is a section showing a modified form of means for attaching ring to the rim body member.
Figure 5:
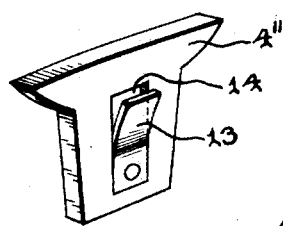
Figure 5 is a perspective of the key as used in the modified form as shown in Figure 4.
Figure 6:
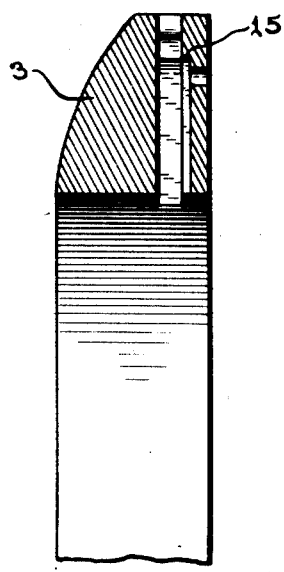
Figure 6 is a fragmentary transverse section of a ring embodying the modification shown in Figure 4, without the key.

The modified form shown in Figures 4, 5, and 6 does away with the screw 6 substituting therefor a spring 13 resting in a recess 14 in key 4. A shoulder 15 acts as a stop for spring 13 when key 4 is in place. When it is desired to disengage spring 13, a screwdriver or other tool may be inserted through an opening in the ring and spring 13 depressed so as to escape shoulder 15 when the key may easily be removed.

Figure 7:
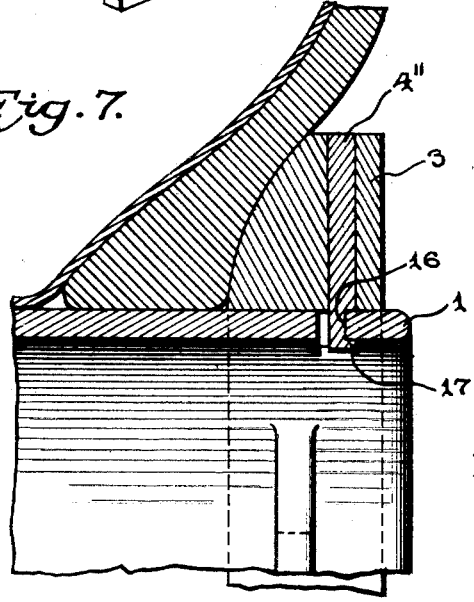
Figure 7 is a fragmentary cross-section showing another modified form of means for attaching the ring to the rim body member.

Figure 7 shows a key 4" extending through the rim and having a recess 16 therein so as to form the head 17. The tire is placed on the rim body member 1 uninflated, the ring 3 is placed thereon, and the keys 4" dropped in place. The tire is then inflated which causes the entire ring carrying the keys to move outward until the recess 16 in each key engages the edge of the rim and the head 7, overlaps the underside of the rim holding the same securely in place.

When it is desired to remove the tire, the tire is deflated, the ring pushed inwardly until the heads of the keys exactly coincide with the opening in the rim body member, whereupon, the keys may easily be removed and the tire and ring slipped off the rim body member.

Having described my invention, what I claim as new and novel is:

A tire rim comprising a body portion, a tire engaging ring mounted on the body portion adjacent one edge thereof having circumferentially spaced slots, the rim body portion being provided with slots corresponding to those in the ring, key members passing through said slots in the ring and body portion and screw members threaded in the ring from its outer face passing transversely through the keys to hold same in locked relation to the ring.

In testimony whereof I affix my signature.

THEODORE A. KECK, Jr.